United States Patent

[11] 3,625,853

[72] Inventors: John Gowen Melvin, Deep River, Ontario, Canada; Alec Duncan McEachern, Harwell, Didcot, England; John Gerald McManus, Ottawa, Ontario, Canada
[21] Appl. No. 770,633
[22] Filed Oct. 25, 1968
[45] Patented Dec. 7, 1971
[73] Assignee Atomic Energy of Canada Limited, Ottawa, Province of Ontario, Canada
[32] Priority Nov. 29, 1967
[33] Canada
[31] 006,191

[54] PREFERENTIALLY SURFACE MACHINING PARTICULAR AREAS OF A WORKPIECE
4 Claims, 3 Drawing Figs.

[52] U.S. Cl. ..................... 204/224, 204/225, 204/228
[51] Int. Cl. ..................... B23p 1/02, C23b 5/76
[50] Field of Search ............ 204/224, 143 M, 225, 228

[56] References Cited

UNITED STATES PATENTS

| | | | |
|---|---|---|---|
| 2,319,196 | 5/1943 | Anderson et al. | 204/224 |
| 3,448,024 | 6/1969 | Philpott | 204/224 X |
| 3,453,192 | 7/1969 | Wilkinson | 204/224 X |
| 3,479,273 | 11/1969 | Taylor et al. | 204/224 |

Primary Examiner—Daniel E. Wyman
Assistant Examiner—C. F. Dees
Attorney—James R. Hughes ABSTRACT: The uniform thickness of a workpiece is achieved by measuring the workpiece thickness, for example, by ultrasonic waves, and in response thereto preferentially, electrochemically machining the portions of the workpiece having increased thickness.

INVENTORS
JOHN G. MELVIN
ALEC D. McEACHERN
JOHN G. McMANUS

By J. R. Hughes
AGENT

PREFERENTIALLY SURFACE MACHINING PARTICULAR AREAS OF A WORKPIECE

This invention relates to surface machining, and particularly to the preferential surface machining of particular areas of a workpiece.

Existing machining processes do not permit the fine preferential machining to a uniform thickness, of an irregular surface, for example an elliptical tube.

This invention achieves a system of preferentially removing metal from particular areas of a surface in response to the dynamic measurement of the thickness of the work, even when the work is rotated. Inherent to the system is the process of producing a constant and specified wall thickness of a workpiece independent of its surface profile. This is advantageous in machining of components for nuclear reactors in order to reduce the neutron capture ratio; as well as machining articles to minimum thickness to reduce weight. It might also find application in the machining of a thin material when a lack of rigidity prevents machining by conventional means.

This is accomplished by using a cutting head which rides on the work surface and removes material in response to the thickness of the work. A uniform thickness results. Preferably the cutting head makes many passes over any given area of surface and the rate of removal is constant and small in magnitude.

The invention therefore contemplates an apparatus for preferentially removing material from particular areas of the surface of a workpiece comprising:
  a. means for dynamically measuring the thickness of successive overlapping areas of surface of the workpiece.
  b. Means for selectively eroding material from the areas in response to the dynamic measurement of the thickness thereof such that the thickness of the work is rendered more uniform.

The invention also contemplates a method of preferentially removing material from the surface of a workpiece comprising the steps of:
  a. measuring, dynamically, the thickness of successive overlapping areas of surface of the workpiece;
  b. eroding, selectively, material from the areas in response to the dynamic measurement of the thickness thereof.

This invention will now be described, by way of example reference being had to the accompanying drawings which:

Figure 1:
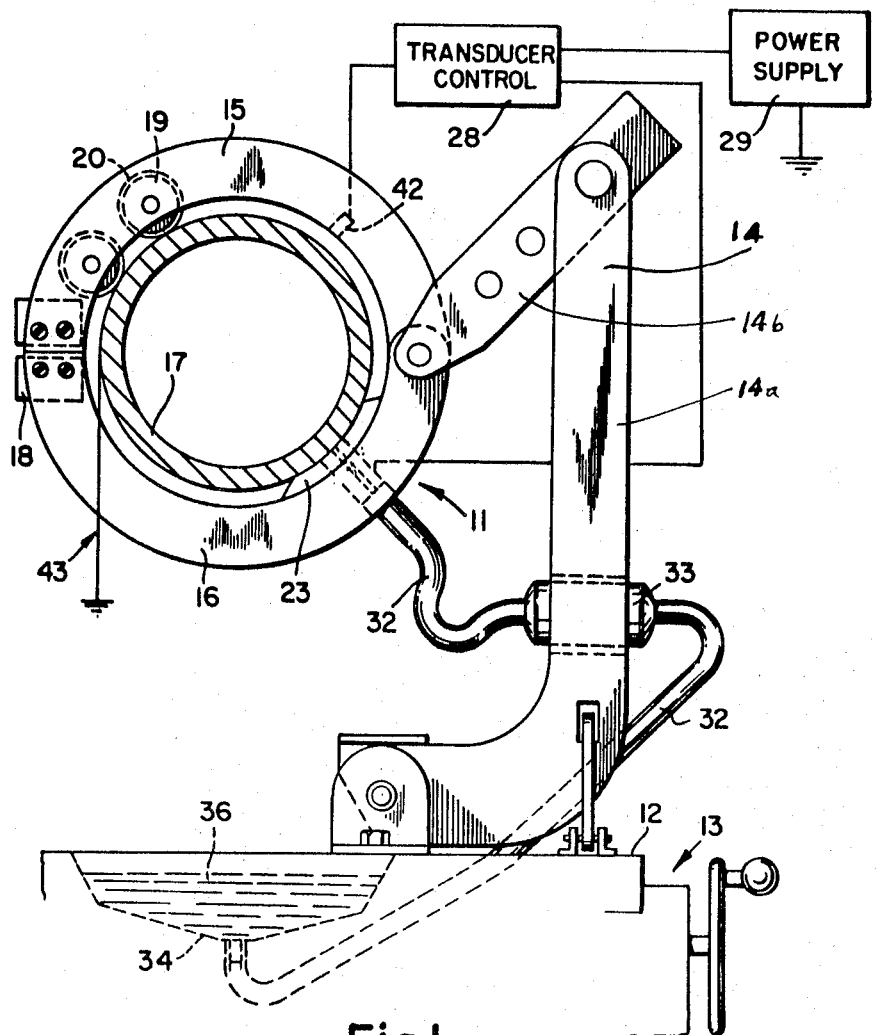
FIG. 1 is a side elevation of one embodiment of the invention where an electrolytic machining process is used.

In our preferred embodiment an annular shaped head 11 is pivotally affixed to the tool carriage 12 of a machine lathe 13 by a link mechanism 14 to swing with a link 14a therefore about a fixed link 14b therefore. The head 11 includes arcuate portions 15 15 and 16 hinged to open and close about cylindrical workpiece 17, the surface or contour of which is to be machined. The collar portions 15 and 16 may be secured in a closed position by appropriate means, as by bolts (not shown) through apertures 18. The collar portions 15 and 16 have nylon wheels 19 mounted therein with tires 20 circumscribing each wheel, freely rotatable while supporting and locating the head 11 on the workpiece 17. Also mounted on the head 11 is a hollow electrode 21 slidably mounted in an electrically insulating holder 23, at a position diametrically opposite to the wheels 19 composed of appropriate material such as polytetrafluoroethylene. Electrode 21 which rides over the surface of the work 17, is held in close proximity to the surface of the work 17, holder 23. As will become more apparent, electrode 21 rides over the workpiece 17 and is biased, by hydraulic forces, against the surface of the workpiece 17, although not touching it. The electrode 21 makes electrical connection through appropriate cables 27 and through a voltage control network 28 to direct current source 29.

The electrode 21 is preferably cylindrical and has a channel or passage 31 which communicates with a flexible conduit 32 through a pump 33 into a catch basin 34 containing a reservoir of electrolyte 36. The pump withdraws the electrolyte 36 from the catch basin 34 and pumps it out the passage 31 in a thin film form. The electrolyte 36, flowing from the passage 31 traverses a gap 37 between the electrode and the workpiece 17 of about 0.002 to 0.006 inches. The velocity of the electrolyte flowing through the gap 37 decreases because of the increasing cross-sectional area of the gap 37 between the electrode face 38 and the workpiece 17 electrode end face 38 is contoured to the cylindrical surface of the workpiece 17.

Figure 2:
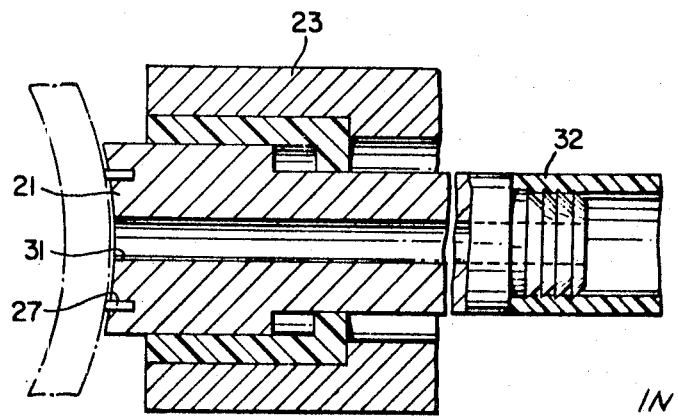
FIG. 2 is an enlarged sectional side elevation of the electrode of FIG. 1 along its centerline.
Figure 3:
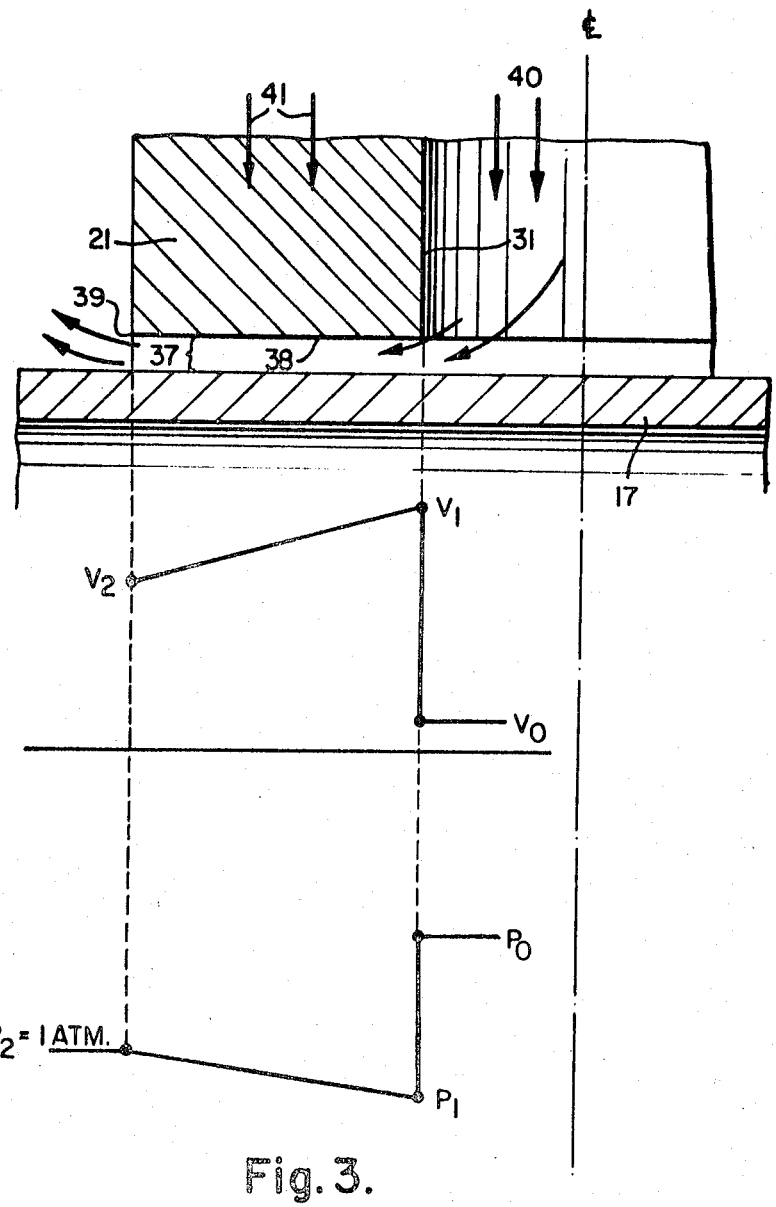
FIG. 3 is an explanatory diagram of the hydraulic pressure profile for the electrolytic flowing through an electrode and between the interfaces of the electrode and a workpiece.

Referring to FIG. 3 where ₵ represents the center line of the electrode 21, and the passage 31 therethrough. The curve $V_0$, $V_1$, and $V_2$ represent the velocity gradient of the electrolyte 36 which flows through the passage 31, along the face 38 of electrode 21 i.e., between the face 38 and the work 17 past the outer edge 39 of the electrode. This flow is represented by arrows 40. The velocity gradient, curve $V_0$, $V_1$, and $V_2$ generates a static pressure gradient, curve $P_0$, $P_1$, and $P_2$ across the gap 37. Since the static pressure gradient $P_2$ at the outer edge 39 of the electrode 21 must be atmospheric, and since the velocity gradient across the face 38 decreases from $V_1$ to $V_2$, because the cross-sectional area of the gap 32 becomes increasingly larger as we travel out from the axis center line) of the passage 31, the pressure in the gap 37 ($P_1$ to $P_2$) is subatmospheric. This subatmospheric pressure ($P_1-P_2$) generates a force in the direction of arrows 41 which acts on the freely movable electrode 21 and tends to cause it to move toward the work 17 and hence to close the gap 37. An opposing force, that of the electrolyte flow 40, balances the subatmospheric pressure ($P_1-P_2$) to cause the face 38 to find a position near, but not touching, the work 17. For each given electrolyte supply pressure, these forces balance for different widths of the gap 37, the width being related to the magnitudes of the forces. That is, the supply pressure multiplied by the area of the passage 31 is equal to the sum of the forces represented by the arrows 41. In order to prevent the electrode 21 from coming into contact with the work, in the event of the loss of electrolyte flow or gross misalignment of the electrode with the work, several insulating buttons of nylon are inserted into the electrode face, as illustrated in FIG. 2, and protrude therefrom approximately 0.002 inches.

The thickness of the piece of work 17 is measured with the aid of a sensor or transducer 42 which may be positioned at an angle to the electrode 21, for example, 90°. The transducer 42 is connected to the control network 28, and the network connects or disconnects the source 29 to the electrode 21, according to the signal received by the transducer 42 as to the measurement of the thickness. In this manner electrochemical erosion of the surface of the work 17 takes place. The network will normally include a delay mechanism to place measurement and cutting in registry with the work 17 if the transducer 42 is disposed at an angle to the electrode 21 (cutting head as illustrated.)

In operation the work 17 rotates under the head 11. The pump 33 pumps electrolyte 36 through the passage 31, on to the work 17. The pressure of the electrolyte issuing from the passage 31 forces the electrode 21 away from the surface of the work. This force is opposed by a suction force generated by the electrolyte flow in the gap, as previously described. As a result of these two opposing forces, the electrode 21 is held in dynamic proximity to the surface of the radiating work 17 preferably 0.002 to 0.006 inches therefrom.

Machining is achieved by electrolytic erosion of the surface of the rotating work under the electrode 21. This erosion results from the flow of electric current through the electrolyte 36 disposed between the electrode 21, the work 17 and thence through the sliding grounding contact 43 to ground. The current from the source 29 is switched off and on by the control network 28 which may be of any convenient type, for example, ultrasonic pulse-echo, magnetic, eddy current or mechanical.

The control network 28, may for example operate in the following manner. The control network 28, in cooperation with a transducer 37, generates from the transducer 37, a pulsed ultrasonic sound which, in response to the thickness of the work 17 is reflected from the surfaces of the work as a particular pulsed secondary ultrasonic waves. The secondary ultrasonic waves are detected by the transducer 37 during the time interval that the transducer 37 does not generate pulsed ultrasonic waves. The secondary ultrasonic waves detected by the transducer 37, during the detection interval, are amplified by the control network 38. If the secondary ultrasonic waves indicate the thickness of the work 17 is in excess of that desired, the network 28 switches, through an appropriate delay mechanism if required which is cooperative with the speed of rotation of the work and connects the direct current source 29 through the electrode 21 to indicate erosion of the surface of the work 17. The delay mechanism (not shown) if provided will ensure registry of areas of measurement with areas of erosion. That is, the delay mechanism ensures that secondary ultrasonic waves only activates current flow through the electrode 21 and thence to the work 17, whereby erosion takes place, after that area of the workpiece, which was subjacent to the transducer 42 and thus measured, is rotated to the cutting position subjacent to the electrode 21. In the latter position erosion takes place on the surface of the work. If the signal indicates that the source 29 is not connected to the electrode 21. No erosion takes place.

The current generated by the DC source 29 may be between 100 and 500 amperes but in any event is adjusted to provide a current density between the electrode 21 and the workpiece 17, such that no portion of the work can be eroded during the traverse to less than the thickness desired. That is, if the tolerance of thickness of the work 17 is to be 0.0005 inches, then the current generated by the DC source during a final machining is such that, in accordance with Faraday's Law, no erosion of the surface to a depth less than 0.0005 inches in any single transverse occurs.

It may also be provided that the control network 28 includes an averaging means which averages the thickness of the work over a fixed number of radians (arc). This assists in eliminating spurious responses caused by noise or other factors which might institute a "cut" signal when one is not desired.

By slowly traversing the tool carriage 12 along the lathe 13 erosion of the whole axial surface of the rotating work 17 may readily be accomplished. If the rate of traversing of the tool carriage along the lathe is slow enough, or if a number of transducers are made, a given area of workpiece 17 will traverse under the electrode 21, a number of times (as well as under the transducer 42.) This repetitive sequence will result in machining the workpiece to a uniform thickness.

The desired machining of a portion of the surface of the workpiece 17 could be accomplished without rotating the workpiece, but instead by moving the electrode 21 by appropriate means, over that area of the surface to be machined. In this embodiment, the location of the transducer 42 would have to be such that it would "lead" the electrode 21. The delay mechanism of the transducer control 28 would have to be adjusted such that the measurement and cutting would be in registry as more clearly explained above.

Alternatively, the control 28 could be activated by a template or other device such that machining of a pattern is achieved. Obviously, in any of the above operations, the control 28 could provide that the electrical current flowing from the direct current source 29 to the electrode 21 and thence through the electrolyte 36 to the surface of the workpiece could be modulated, according to the amount of erosion required, rather than turned off and on as explained herein.

The embodiments of the invention in which an exclusive property or privilege is claimed are defined as follows:

1. Apparatus for preferentially removing material from particular areas of a cylindrical surface of a tubular workpiece, comprising an annular shaped head, means pivotally mounting the head for the workpiece to pass through the head, means for supporting and locating the head for riding around said cylindrical surface and emitting an electrical signal of magnitude dependent upon the thickness of said workpiece beneath successive overlapping areas of said cylindrical surface, a hollow electrode slidably mounted on said head and having an end face contoured to the cylindrical surface, riding over said cylindrical surface on a flow of electrolyte at a position diametrically opposite to said head supporting and locating means, means for feeding electrolyte through said electrode to a gap between said electrode and said cylindrical surface, means for passing an electric current from the electrode through the electrolyte to the workpiece for electrolytic erosion of the workpiece, and switching means for controlling the passage of said electric current to the electrode in dependence of said electrical signal from said sensing means so that no portion of said workpiece is eroded less than a predetermined thickness.

2. Apparatus according to claim 1, wherein said sensing means senses the workpiece thickness by means of pulsed ultrasonic sound.

3. Apparatus according to claim 1, which includes means for adjusting the magnitude said electric current in dependence of the electrical signal from said sensing means to cause greater erosion where the workpiece is of greater thickness.

4. Apparatus according to claim 1, wherein said annular shaped head comprises two arcuate portions hinged to open and close about the cylindrical surface.

* * * * *